Nov. 7, 1939.        C. C. COONS        2,178,869
ABSORBER FOR REFRIGERATING SYSTEMS
Filed June 7, 1935
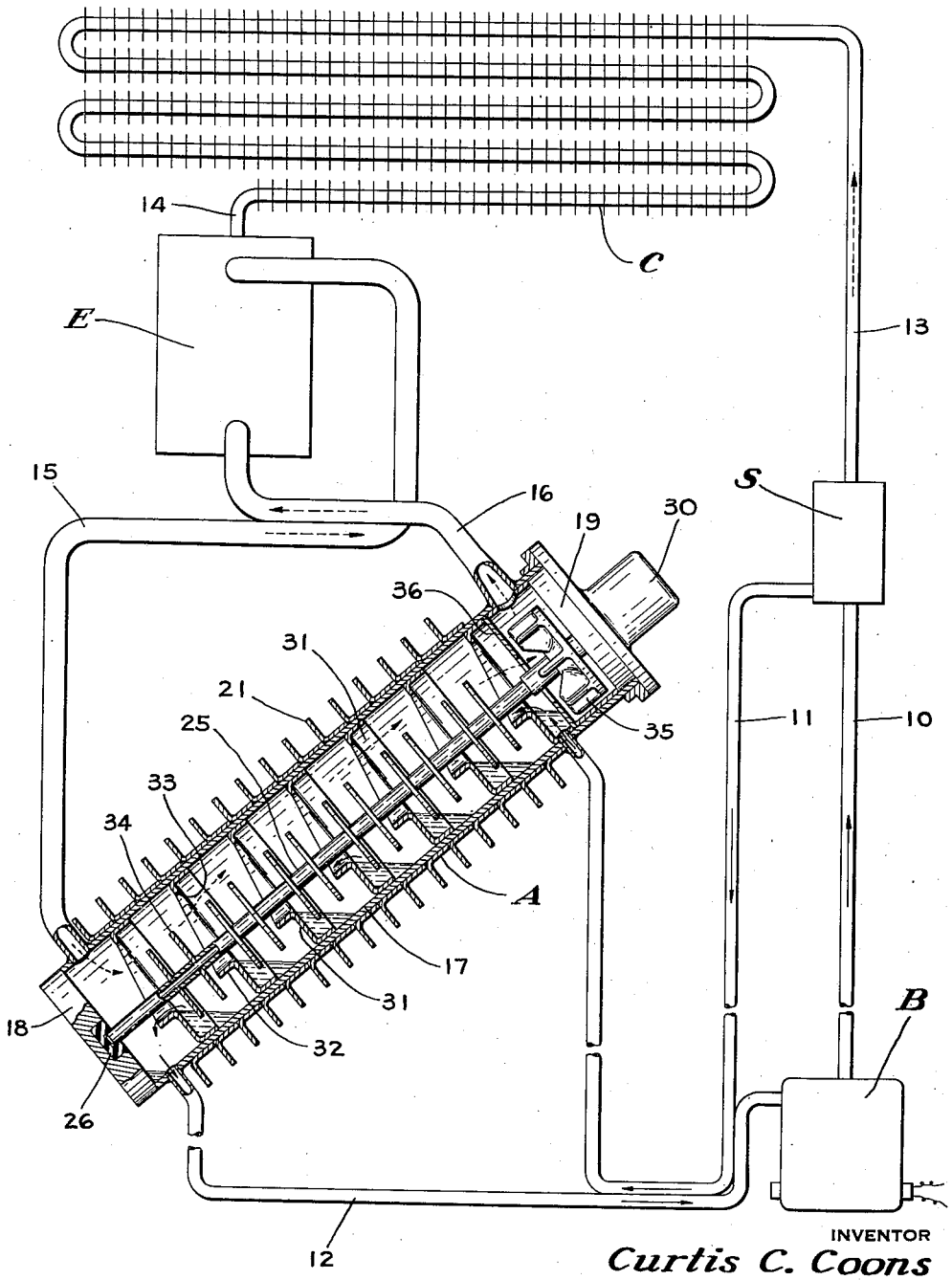
INVENTOR
*Curtis C. Coons*
BY
*Harry J. Ducarse*
ATTORNEY Patented Nov. 7, 1939

2,178,869

UNITED STATES PATENT OFFICE 2,178,869

ABSORBER FOR REFRIGERATING SYSTEMS

Curtis C. Coons, North Canton, Ohio, assignor to The Hoover Company, North Canton, Ohio, a corporation of Ohio Application June 7, 1935, Serial No. 25,368

10 Claims. (Cl. 62—119.5)

This invention relates to absorption refrigerating systems, and more particularly to the absorbers thereof.

Continuous absorption refrigerating systems in which an inert gas is employed as a pressure equalizing medium are well known. While certain features of the present invention are applicable to systems in which no inert gas is employed, the arrangements illustrated are particularly suitable for use in an inert gas system.

In any continuous absorption refrigerating system the problem of quickly and effectively absorbing the refrigerant in the absorption liquid is a rather difficult one and this difficulty is increased if the absorber is air cooled. The problem may be largely solved if the refrigerant and absorption liquids are brought into intimate contact in the absorber and the heat of absorption quickly dissipated.

Accordingly, it is one object of the present invention to provide means for causing refrigerant and absorption liquid in the absorber to come into very intimate contact with each other.

It is a further object of the invention to provide a compact and practical assembly for circulating inert gas through the absorber while keeping all the fluids therein in a state of agitation so that they are at all times intimately mixed.

It is still a further object of the invention to keep a large surface in the absorber wet with absorption liquid, particularly near the outside of the absorber so that the heat of absorption may be quickly dissipated.

Still another object resides in the provision of means for hermetically sealing the absorber from the atmosphere while accomplishing any of the above objects.

I propose to form a plurality of sprays of absorption solution through which a refrigerant laden inert gas is forced to pass. More specifically, I propose to pass a refrigerant laden body of inert gas through a plurality of pairs of sprays of absorption solution. I propose to generate one spray of each pair by a rotating body dipping into a pool of liquid and to generate the other spray of each pair by causing liquid overflowing from one pool to another to strike a rotating member.

Other objects reside in certain novel features of the arrangement and construction of parts as will be apaprent from the following description taken in connection with the accompanying drawing in which:

There is illustrated a continuous three fluid absorption refrigerating system embodying my invention.

Referring to the drawing in detail, a conventional continuous absorption refrigerating system is illustrated as consisting of a boiler B, a gas separation chamber S, condenser C, an evaporator E and an absorber A, together with interconnecting conduits as indicated. Absorption liquid, such as water, may be circulated between the boiler B, the gas separation chamber S and the absorber A by means of conduits 10, 11 and 12. The conduit 10 serves as a vapor lift pump for raising absorption liquid from the boiler B to the gas separation chamber S. From the chamber S the liquid flows by gravity through the conduit 11, the absorber A and the conduit 12 back to the boiler. The conduits 11 and 12 may be in heat exchange relationship as indicated.

Refrigerant, such as ammonia, is expelled from the solution in the boiler B and the gas separation chamber S by the application of heat thereto and flows through the conduit 13 into the condenser C, which is preferably air cooled, from which it is drained as a liquid into the evaporator E through the conduit 14.

Inert gas, such as nitrogen or hydrogen, is circulated between the evaporator E and the absorber A by means of the gas conduits 15 and 16 which may be in heat exchange relation. This inert gas circuit also provides means for conducting vaporous refrigerant from the evaporator into the absorber where the refrigerant is again absorbed in the absorption liquid and returned to the boiler.

The present invention is concerned primarily with the absorber of this system and accordingly the absorber is shown in detail. The absorber may consist of an inclined cylindrical vessel 17 which is constructed from material capable of withstanding the high pressures commonly encountered in absorption refrigerators. A bottom 18 and a top piece 19 are welded to the ends of the vessel 17 to form a closed sealed structure. This vessel is shown as being air cooled, heat radiating fins 21 being secured to the outside thereof. A plurality of spaced baffle plates 31 are mounted within the vessel 17 and extend transversely thereof. Each of the plates or disks 31 is provided with a depending flange or spout 32 along the lower portion of a hole 35 therein. The holes 33 in the baffles 31 are offset upwardly from the center thereof so that a plurality of pockets for the formation of liquid pools are formed when the absorber vessel is inclined as illustrated.

The closure plate 19 carries an electric motor 30 which may be of any known construction but should preferably be hermetically sealed or have its rotating element hermetically sealed to the absorber. A known type of electric motor in which the field construction is on the outside and the rotor is on the inside of a dividing partition or casing may be employed for this purpose. A shaft 25, which is driven by the motor 30, extends the entire length of the casing 17 and is journalled in a rubber bearing 26 carried by the lower closure plate 18.

An inert gas fan 35 is mounted on the shaft 25 in a chamber formed by a plate 36 and the plate 19. The plate 36 is provided with a central opening forming a fan eye through which extends the shaft 25. The fan 35 circulates the inert gas upwardly through the absorber and into the conduit 16 of the inert gas circuit previously described.

A plurality of spaced pairs of discs or agitating elements 34 are mounted on the shaft 25 for rotation therewith. The arrangement is such that one pair of discs is positioned between each pair of baffle plates 31. Some of these agitating elements 34 may be positioned just below the spouts 32 on the plates 31 so that liquid which drips off of the spouts 32 will fall upon the rotating discs. In so doing the liquid will be immediately thrown outwardly and spray the inner wall of the absorber vessel. One or more of the other rotating elements 34 may dip into the pools of liquid formed along the lower side of the absorber as mentioned above to continuously splash this liquid over the inner wall of the absorber.

The arrangement disclosed provides a construction in which the plates 31 may be secured to the inside of the vessel before the shaft assembly is placed therein. This is possible because the openings 33 in the plate are large enough to permit the rotating discs 34 to be passed therethrough. The shaft and motor assembly may then be lowered into operating position and the end plates 18 and 19 as well as the upper discs 36 may then be welded or otherwise secured in position. The discs 31 may be spot welded in the absorber vessel, if desired.

While only one embodiment of the invention has been illustrated and described herein, it is obvious that various changes may be made without departing from the spirit of the invention or the scope of the annexed claims.

I claim:

1. An absorber adapted for use in an absorption refrigerating system comprising an elongated vessel disposed in an inclined position, means for supplying absorption liquid to the upper end of said vessel, means for removing absorption liquid from the lower end thereof, means for supplying a gas to be absorbed to said vessel, baffle plates in said vessel extending transversely across the same to cause the formation of a number of pools along the lower side of said vessel, said plates having depending spouts thereon to carry away the overflow from the pools, rotary splashing means within said vessel including a number of rotating elements certain of which are arranged to dip into the pools and throw the liquid therefrom about the inner wall of said vessel and others of said rotating elements being disposed beneath said spouts whereby the absorption liquid drips from said spouts upon said rotating elements and is splashed around the inner wall of said vessel.

2. In an absorption refrigerating system in combination, an evaporator, an absorber, conduits connecting the evaporator and absorber to provide a circuit for inert gas therebetween and means for circulating absorption liquid through said absorber, said absorber having a combined gas circulator and splashing means therein for promoting the circulation of the inert gas over its circuit and for bringing the gas into intimate contact with the absorption liquid, said combined gas circulator and splashing means including baffle plates in said absorber arranged to cause the formation of pools of liquid therein and rotating means including elements arranged to dip into said pools and throw the liquid from said pools about the interior of the absorber, and elements adapted to be struck by liquid passing from pool to pool.

3. The method of operating an absorption refrigeration system having an evaporator and an absorber and employing a refrigerant, and an absorption medium, comprising passing the refrigerant from an evaporating zone into intimate contact with a plurality of pools of absorption medium, such contact being increased by removing small portions of certain of said pools and creating fine particles thereof, creating fine particles of liquid passing from pool to pool, and then causing a forced circulation of said refrigerant over said particles whereby the refrigerant is rapidly absorbed by the absorption medium.

4. The method of operating an absorption refrigeration system having an evaporator and an absorber and employing a refrigerant, an absorption medium, and a pressure equalizing medium, comprising evaporating the refrigerant into the pressure equalizing medium, forming a pool of the absorption medium, gradually withdrawing portions of said pool and forming a spray thereof, forming a spray of absorption medium passing from said pool, and forcibly circulating the mixture of refrigerant and equalizing medium in gaseous phase through said sprays whereby the refrigerant is separated from the equalizing medium by the absorption medium.

5. An absorber adapted for use in an absorption refrigerating system comprising a closed vessel, means for causing absorption liquid to flow through said vessel, gas conduits connected to said vessel and rotating means within said vessel for causing gas to flow therethrough and for splashing the absorption liquid over the inner wall of said vessel to bring the gas and liquid into intimate contact and for aiding in the transfer of heat to the exterior of said vessel, said last mentioned means including spaced baffle plates fixed to said vessel to form liquid pools therewith and pairs of rotating members disposed between adjacent baffle plates constructed and arranged to create sprays of liquid dripping from said plates and to create sprays of liquid directly from said pools.

6. An absorber adapted for use in an absorption refrigerating system comprising an elongated vessel, means for supplying absorption liquid to the upper end of said vessel, means for removing absorption liquid from the lower end of said vessel, gas conduits connected to said vessel, baffle plates within said vessel and extending transversely across the same, there being an opening in each baffle plate and rotating means in said vessel adapted to cause gas to flow therethrough, rotating means for said vessel adapted to splash absorption liquid about the inner surface of said vessel, said rotating means including means adapted to dip into pools of absorption liquid formed between said baffle plates and to splash the same about and rotating means adapted to splash absorption liquid passing through said baffle plates.

7. That improvement in the art of refrigeration which includes the steps of propelling a gas to be absorbed through an absorption zone, forming a plurality of separated pools of absorption liquid in said absorption zone, causing said gas to pass through successive sprays of liquid formed by removing portions of liquid from said pools, and causing said gas stream to pass through successive sprays of liquid generated from liquid passing between said pools, and dissipating the exothermic heat of absorption to the surrounding medium.

8. An absorber adapted for use in an absorption refrigerating system comprising a vessel, means for conveying absorption solution to and from said vessel, means for conveying pressure equalizing medium to and from said vessel, said absorber having a combined gas circulator and splashing means therein for promoting the circulation of the inert gas over its circuit and for bringing the gas into intimate contact with the absorption liquid, said combined gas circulator and splashing means including baffle plates in said absorber arranged to cause the formation of pools of liquid therein and rotating means including elements arranged to dip into said pools and throw the liquid from said pools about the interior of the absorber and elements adapted to be struck by liquid passing from pool to pool.

9. That method of absorbing a refrigerant in an absorbent which includes the steps of passing the refrigerant into contact with a plurality of pools of absorbent, increasing the refrigerant absorbent contact by removing small portions of certain of said pools and creating fine particles thereof, creating fine particles of liquid passing from pool to pool, and then causing a forced circulation of said refrigerant over said particles whereby the refrigerant is rapidly absorbed by the absorption medium.

10. That method of absorbing a refrigerant in an absorbent which includes the steps of propelling a mixture of the refrigerant in an inert gas over a plurality of spaced pools of absorbent, flowing the absorbent from pool to pool, creating a sheet-like spray of the solution in each pool and generating a sheet-like spray of the solution in its passage between adjacent pools.

CURTIS C. COONS.